UNITED STATES PATENT OFFICE.

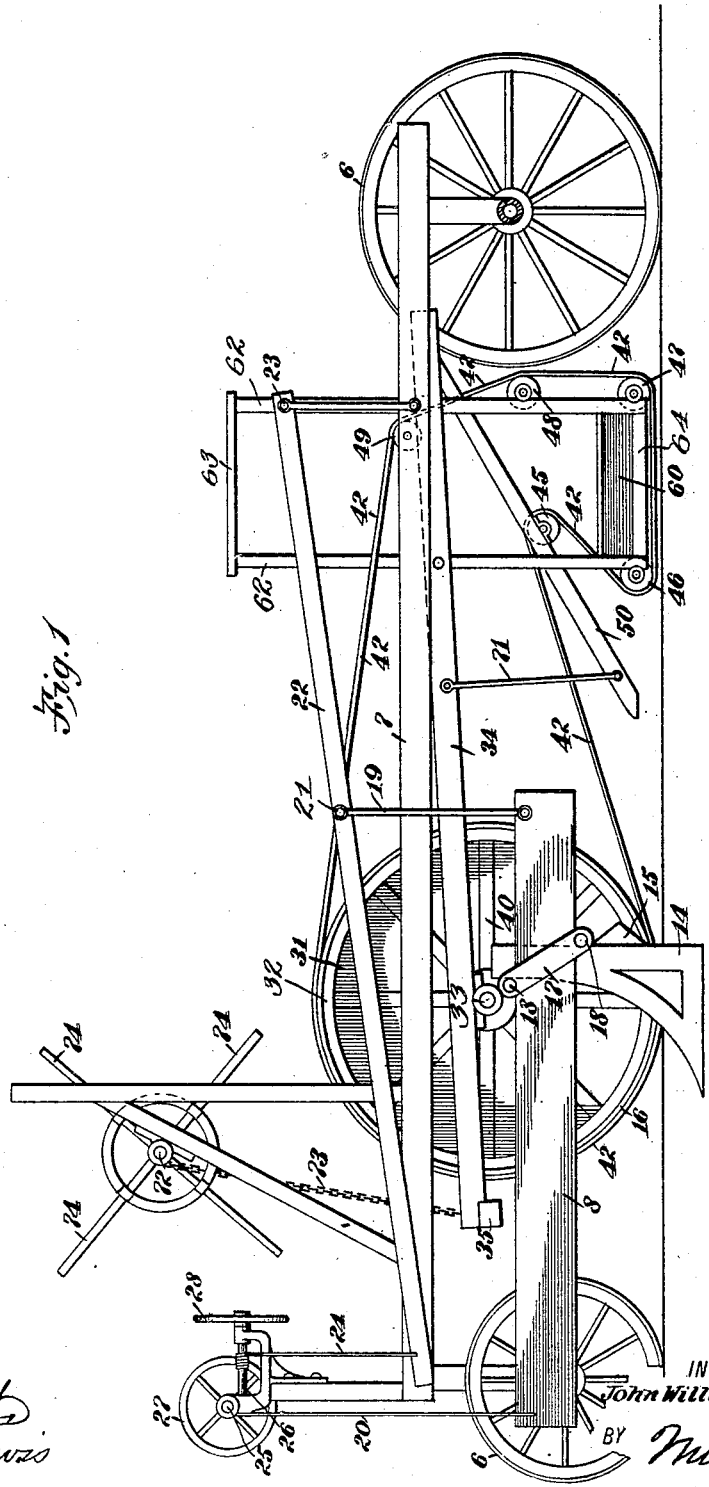

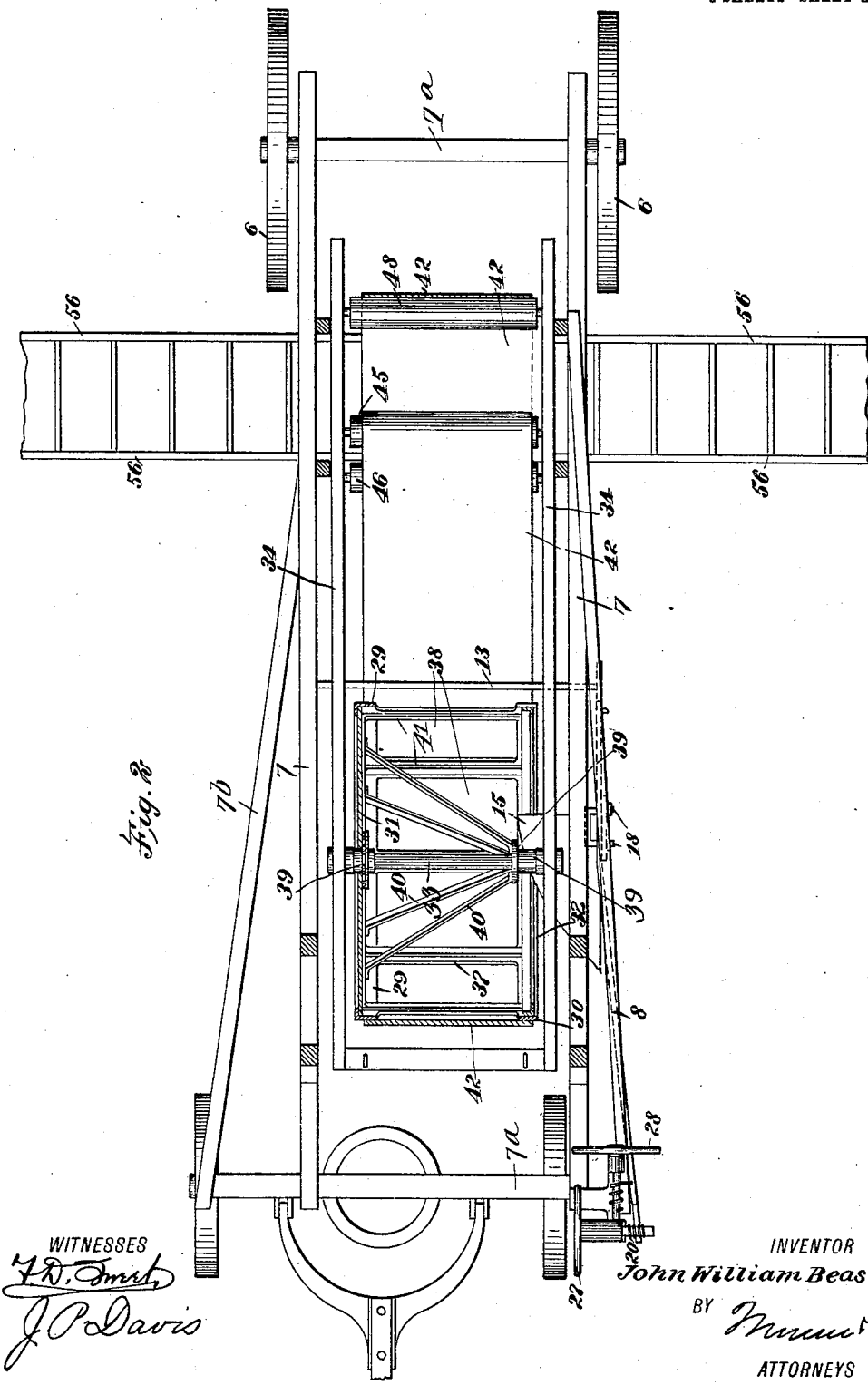

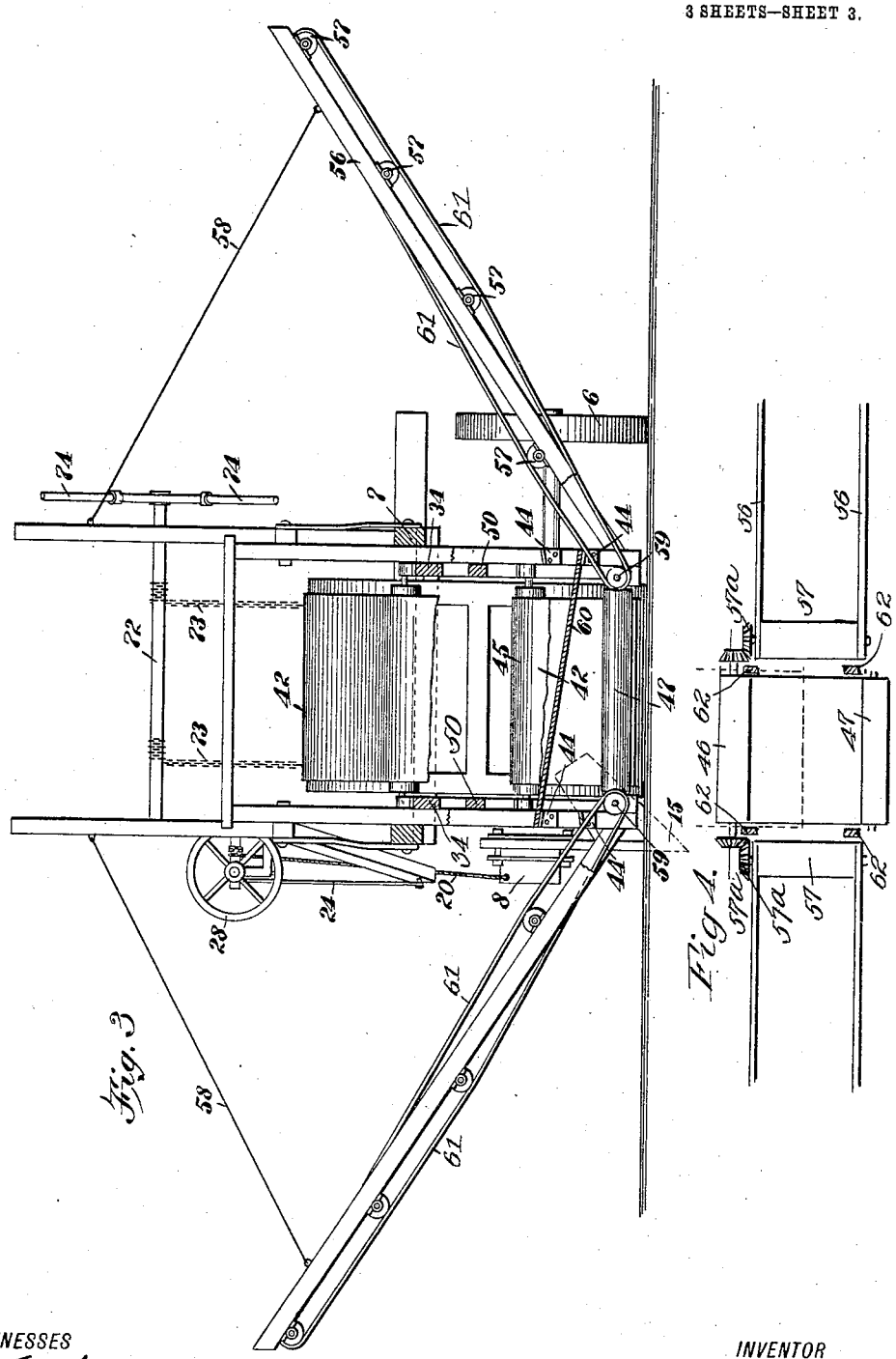

JOHN WILLIAM BEASLEY, OF MODESTO, CALIFORNIA.

GRADER.

968,915.  Specification of Letters Patent.  Patented Aug. 30, 1910.

Application filed May 29, 1909. Serial No. 499,171.

*To all whom it may concern:*

Be it known that I, JOHN WILLIAM BEASLEY, a citizen of the United States, and a resident of Modesto, in the county of Stanislaus and State of California, have invented a certain new and useful Grader, of which the following is a full, clear, and exact description.

The principal objects which the present invention has in view are: to provide a mechanism whereby the earth is plowed, and delivered to an elevator and distributer; to provide a continuously acting mechanism for delivering the plowed dirt at each side of the machine alternately, so that the same may be distributed or received in a conveyer for removal, said delivery being manually controlled; to provide a receiving drum adapted to guide the delivery belts and to form a driving member therefor and deliver the dirt from the interior of the said drum upon the said belts; and to provide the desired manually operated controls for the operating mechanism.

One embodiment of the present invention is disclosed in the structure illustrated in the accompanying drawings, wherein like characters of reference denote corresponding parts in all the views.

Figure 1 is a side elevation of a machine built in accordance with the present invention; Fig. 2 is a plan view of the machine, partly in section, the driving wheel for the conveyer belt being shown as cut away, and the standing rigging on the main beams of the vehicle being removed; and Fig. 3 is a rear end elevation of the machine, showing the side conveyers and one of the fenders in operative position. Fig. 4 is a fragmentary view in plan of the operating and guide rollers for the lateral conveyers.

The various groups of coöperating instrumentalities are mounted upon vehicle wheels 6, suitably mounted to carry the frame of which beams 7 are the main beams. The beams 7 are suitably arranged with cross beams or ties 7ª, 7ª, and brace 7ᵇ adapted to maintain the beams 7 parallel. The machine is adapted to be drawn by a horse team. The front wheels 6—6 are suitably mounted on an axle which swings on a king bolt or other desired construction.

Suspended from the frame is a beam 8 which acts as a plow beam, and in this specification I will so designate the beam 8. Said beam is secured to a plow standard 14 by a strap 17, which is bolted by means of bolts 18 extending past the beam 8 and the standard 14, and secured to a strap corresponding to the strap 17, on the opposite side of the standard 14. The plow is provided with a mold board 15 of any desired shape or size. The wing of the mold board 15 extends within an open ended wheel 16 in such manner as to deliver the furrow when turned, within the interior of the said wheel 16. This method of joining the plow standard to the beam is efficient and readily adapted to adjustment.

The plow beam 8 is suspended in operative position by a rod 19 and cable 20, said rod and cable being connected at the rear and front of the said beam respectively. The rod 19 is fixedly attached at 21 to a suspension bar 22 which is pivotally mounted on the standing rigging at 23, the forward end of the suspension bar being suspended by a cable 24. The cable 20 is wound upon a drum or shaft 25, while the cable 24 is wound upon a drum or shaft 26. The shaft 25 is provided with a hand wheel 27, and the shaft 26 is provided with a hand wheel 28; by the manipulation of the wheels 27 and 28 the depth and dip of the plow may be regulated.

It will be understood that the shafts 25 and 26 and the wheels 27 and 28 have any suitable form of detent for holding the shafts and wheels in their adjusted positions. By winding the cables 20 and 24 upon the drums, the frame, of which the plow beam 8 is a member, may be raised until the plow is held out of contact with the ground.

As above stated, the plow delivers the dirt from the mold board 15 to the interior of the wheel or drum 16. This wheel or drum is constructed as an open or spider frame, and consists primarily of rings 29 and 30, the ring 29 being provided with a solid side plate 31, while the ring 30 is supported by a circular internal flange 32.

The wheel is supported upon an axle 33, which is mounted in bearings in the side members 34 of the suspension frame. This frame is joined at the front by a cross beam 35 and is pivotally mounted on the main beams 7 of the vehicle in the rear of the same. The wheel 16 is cross braced by wide straps 37, so disposed as to form openings 38 through which the dirt is passed to the conveyer belt.

The outer hub 39 is disposed substantially as shown in Fig. 2 of the drawings, and consists of flanges adapted to receive the ends of braces 40. The braces 41 are extended across the rim of the wheel to reinforce the same. The braces 40 are extended from the hub, disposed at the open side of the wheel and connected to the plate 31 forming the closed side of the wheel. The straps 37 are placed at intervals sufficiently close to form substantially a continuous tread for the wheel 16 when the same is carrying the conveyer belt 42.

The conveyer belt 42 is formed of heavy leather or canvas belting, or other suitable material, and is reinforced and protected in its outer surface where it is brought in contact with the ground in passing over the wheel 16. The belt 42 is a single width of material, and is threaded over rollers 45, 46, 47, 48 and 49. The roller 45 is mounted upon beams 50 which are rigidly secured to the side members 34 by means of a hanger 71.

The inner surface of the conveyer may be formed as shown in the drawings, or may be battened or provided with conveyer cleats, being suitably disposed to fall within the openings 38. In the operation of the belt conveyer 42 the dirt is carried from the wheel 16 and supported between the said wheel 16 and the roller 45. As the belt passes over the roller 45 the dirt carried on the upper surface thereof is precipitated upon a fender 60, mounted in an inclined position as shown in Fig. 3 of the drawings, and held on brackets 44. The fender 60 may be adjusted to incline toward either side of the machine, the brackets 44 being duplicated and oppositely disposed. In either position, the fender 60 throws the dirt to one or the other of the conveyers 61. These are belt conveyers and are suitably mounted upon rolls 57 which are mounted in arms 56 supported by cables 58 which are suitably anchored on the said arms 56 and the standing rigging of the machine. The arms 56 are pivotally mounted at 59 and are adapted to fold to a vertical position against the sides of the machine, when moving to and from the field of action.

The conveyers 61 are driven by lower rolls 57 which are connected in any suitable manner with either of the rolls 46 or 47, whereby the same travel is imparted to the conveyers 61 as is imparted to the belt 42. The special mechanism herein shown, as the connection between the rollers 46 and 47 and the rollers 57 is bevel gears 57$^a$, 57$^a$. It will be understood that either of the rollers 46 and 47 may be used in this connection.

The rollers 46, 47, 48 and 59, 59 are mounted in bearings attached to the standing members 62, 62 of the vertical frame. The members 62 are rigidly attached to the side members 34 to be raised and lowered therewith when the same is lifted to clear the wheel 16 from the ground. The standing members 62, 62 are suitably braced by cross braces 63, 63 at the top of the frame, and by cross braces 64, 64 at the bottom of said frame. It will be understood that the total frame formed by the members 34, 34, the cross beam 35, and the conveyer frame formed by the standing members 62, 62 and the cross braces 63, 63 and 64 are rigidly connected to move together, whereby, when the machine is lifted out of operative engagement with the ground, the conveyer, as well as the wheel 16, is raised.

If the operation of the machine is for the purpose of scattering the dirt as plowed, the dirt is allowed to drop over the ends of one or the other of the lateral carriers. But if it be the desire to transport the dirt to a distant point, it is then arranged that a cart or wagon shall be driven alongside the machine in such position that the end of the carrier extends over the body of the cart or wagon, to receive the dirt as delivered therefrom.

With a machine constructed as described, and shown in the accompanying drawings, the operation is as follows:—The dirt is delivered by the mold board of the plow within the wheel 16, and received upon the inner surface of the belt 42. The belt 42 carries the dirt over the roller 45 where it is dumped upon the fender 60, and by the fender 60 is delivered upon the lower end of one or the other of the conveyers 46, to be delivered by the said conveyers over the outer and upper end thereof. By shifting the fender 60 from one incline to the other, the delivery of the dirt from the belt 42 is directed to one or the other of the conveyers 46. If the dirt being plowed is delivered to a wagon or cart for conveyance away from the machine, the cart or wagon is driven alongside of the machine in such manner as to receive the dirt as delivered from the conveyers 46. When the cart on one side has received a full load, the operator shifts the position of the fender 60 to deliver on the opposite conveyer 46, the second cart or wagon having moved into position under the conveyer to which the delivery of the dirt is now changed. If, on the other hand, it is desired to deliver the dirt directly from the machine into the sections of adjacent ground somewhat depressed, this is accomplished by permitting the delivery from one side so long as that side requires filling, and to be shifted to the opposite side when the opposite side requires the filling dirt. In this latter instance, a gang of spreaders is employed in the operation of grading to which this machine lends itself.

When it is desired to remove the machine from the field of operation, the plow beam 8 with the standard 14 and mold board 15 is raised from contact with the ground, by turning the wheels 27 and 28, the effect whereof is to lift the said plow clear of the ground. By turning a windlass 72 by means of handles 74 the framing members 34 and the cross brace 35 are lifted, carrying with them the wheel 16 and the framing supporting the rollers 45, 46, 47 and 48. The arms 56 carrying the conveyers 61 are now folded up against the frame of the machine, turning upon pivots 59. In this position the grading mechanism is held in an inoperative position, and the machine is carried upon the wheels 6 as in other vehicles.

Having thus described my invention, what I claim as new and desire to secure by Letters Patent is,

1. A grader, comprising a plow having a side delivery, a drum adapted to roll upon the surface of the ground beside the said plow, to receive the dirt when delivered therefrom, said drum having peripheral openings for the delivery of the dirt therethrough, a belt adapted to fit around the said drum on the outside thereof, to receive the said dirt from the said plow through the said peripheral openings and extended to the rear of the frame of said grader, a plurality of guide rollers to receive the said belt and guide the same to produce an overhang section thereof to dump the dirt, a laterally extended conveyer interposed in the path of the dirt when delivered from the said belt and adapted to deliver the dirt to one side of the said grader, and a driving mechanism for operating the said conveyer.

2. A grader, comprising a plow having a side delivery, a drum adapted to roll upon the surface of the ground beside the said plow, to receive the dirt when delivered therefrom, said drum having peripheral openings for the delivery of the dirt therethrough, a belt adapted to fit around the said drum on the outside thereof, to receive the said dirt from the plow through the said openings and extended to the rear of the frame of said grader, a plurality of guide rollers to receive the said belt and guide the same to produce an overhanging section thereof to dump the dirt, an inclined platform to receive the dirt when delivered from the said belt, a laterally extended conveyer interposed in the path of the dirt when delivered from the said platform, and a driving mechanism for operating the said conveyer.

3. A grader, comprising a plow having a side delivery, a drum adapted to roll upon the surface of the ground beside the said plow, to receive the dirt as delivered therefrom, said drum having peripheral openings for the delivery of the dirt therethrough, a belt adapted to fit around said drum on the outside thereof to receive the said dirt from the plow through the said opening, and extended to the rear of the frame of said grader, a plurality of guide rollers to receive the said belt and guide the same to produce an overhanging section thereof to dump the dirt, an inclined platform to receive the dirt when delivered from the said belt, means for changing the inclination of the said platform, a plurality of laterally extended conveyers adapted to receive the dirt from the said platform when the said platform is properly inclined, and a driving mechanism for operating the said conveyers.

4. A grader, comprising a plow having a side delivery, a drum adapted to roll upon the surface of the ground beside the said plow, to receive the dirt when delivered therefrom, said drum having peripheral openings for the delivery of the dirt therethrough, a belt adapted to fit around the said drum on the outside thereof, to receive the said dirt from the plow through the said openings and extended to the rear of the frame of said grader, a plurality of guide rollers to receive the said belt and guide the same to produce an overhanging section thereof to dump the dirt, a laterally extending conveyer interposed in the path of the dirt as delivered from the said belt, a suitable driving mechanism for operating the said conveyer, a pivotally mounted frame to carry the said drum and said guide rollers, and means for lifting the said frame to raise the said drum out of contact with the ground.

5. A grader, comprising a plow having a side delivery, a drum adapted to roll upon the surface of the ground beside the said plow, to receive the dirt when delivered therefrom, said drum having peripheral openings for the delivery of the dirt therethrough, a belt adapted to fit around the said drum on the outside thereof, to receive the said dirt from the plow through the said opening and extended to the rear of the frame of said grader, a plurality of guide rollers to receive the said belt and guide the same to produce an overhanging section thereof to dump the dirt, a laterally extended conveyer interposed in the path of the dirt as delivered from the said belt, a driving mechanism for operating the said conveyer, a pivotally mounted frame to carry the said drum and said guide rollers, means for lifting the said frame to raise the said drum out of contact with the ground, and means for raising the said plow out of contact with the ground.

In testimony whereof I have signed my name to this specification in the presence of two subscribing witnesses.

JOHN WILLIAM BEASLEY.

Witnesses:
F. S. KELLEY,
L. J. MADDEN.